(12) United States Patent
McDowell et al.

(10) Patent No.: US 8,982,412 B2
(45) Date of Patent: Mar. 17, 2015

(54) SYSTEMS AND METHODS FOR FACILITATING REPRODUCTION OF ARBITRARY COLORS

(71) Applicants: Matthew McDowell, Pittstown, NJ (US); Mark Gundlach, Caledonia, MI (US); Carmine Matarazzo, Nutley, NJ (US); Xianfeng Zhao, Harrison, NJ (US); Thomas A. Lianza, Bedford, NH (US); Gerald Conde, Wallington, NJ (US)

(72) Inventors: Matthew McDowell, Pittstown, NJ (US); Mark Gundlach, Caledonia, MI (US); Carmine Matarazzo, Nutley, NJ (US); Xianfeng Zhao, Harrison, NJ (US); Thomas A. Lianza, Bedford, NH (US); Gerald Conde, Wallington, NJ (US)

(73) Assignee: X-Rite, Inc., Grand Rapids, MI (US)

( * ) Notice: Subject to any disclaimer, the term of this patent is extended or adjusted under 35 U.S.C. 154(b) by 33 days.

(21) Appl. No.: 13/764,277

(22) Filed: Feb. 11, 2013

(65) Prior Publication Data
US 2013/0215439 A1   Aug. 22, 2013

Related U.S. Application Data

(60) Provisional application No. 61/601,317, filed on Feb. 21, 2012.

(51) Int. Cl.
G06F 15/00 (2006.01)
G06K 1/00 (2006.01)
G06K 15/02 (2006.01)
H04N 1/46 (2006.01)

(52) U.S. Cl.
CPC .............. *G06K 15/025* (2013.01); *H04N 1/46* (2013.01)
USPC ........................................................ 358/1.9

(58) Field of Classification Search
None
See application file for complete search history.

(56) References Cited

U.S. PATENT DOCUMENTS

| 5,323,249 | A |   | 6/1994 | Liang |   |
|---|---|---|---|---|---|
| 6,160,912 | A | * | 12/2000 | Usami | 382/167 |
| 2005/0286085 | A1 | * | 12/2005 | Lee | 358/3.26 |
| 2006/0152745 | A1 | * | 7/2006 | Sanger | 358/1.9 |
| 2006/0170938 | A1 | * | 8/2006 | Ibarluzea et al. | 358/1.9 |

OTHER PUBLICATIONS

Braun, et al., Development and Evaluation of Six Gamut-Mapping Algorithms for Pictorial Images, Digital Imaging Technology Center, Xerox Corporation, 6 pages.

(Continued)

*Primary Examiner* — Vincent Rudolph
*Assistant Examiner* — Michael Burleson
(74) *Attorney, Agent, or Firm* — McCarter & English, LLP (57) ABSTRACT

Systems and methods are provided for facilitating reproduction of arbitrary colors in a workflow by identifying color reproduction processes in the workflow and characterizing the color reproduction processes by determining a statistical variance (e.g., as characterized by a probability density function). Systems and methods are provided for simulating possible output colors for a color reproduction process that involve identifying a desired color for reproduction and determining possible output colors for the color reproduction process based on a predetermined statistical variance. Systems and methods are provided for mapping out-of-gamut-colors for a color reproduction process are provided that involve providing an out-of-gamut color, consulting a database of characterized artistic adjustments, selecting a first adjusted color by applying an artistic adjustment from the database to the out-of gamut color, determining if the first adjusted color is out-of-gamut, and, if out-of-gamut, selecting a second adjusted color by adjusting a magnitude of the vector.

25 Claims, 7 Drawing Sheets

(56) References Cited

OTHER PUBLICATIONS

Morovic, Color Gamut Mapping, Table of Contents, Published in Association with the Society for Imaging Science and Technology, John Wiley & Sons, Ltd.

Pantone Reference library Plus Series Complete Set of Guides and Chip Books, https://www.pantone.com/pages/products/product.aspx, 2 pages.

European Search Report dated Sep. 16, 2014 for European Application No. 13155732.4.

European Application No. 13155732.4, Feb. 19, 2013, 2632143.

* cited by examiner

SYSTEMS AND METHODS FOR FACILITATING REPRODUCTION OF ARBITRARY COLORS

CROSS-REFERENCE TO RELATED APPLICATIONS

This application claims priority to U.S. Provisional Application Ser. No. 61/601,317, filed Feb. 21, 2012, the entirety of which is incorporated by reference herein.

BACKGROUND

1. Technical Field

The present disclosure relates to color reproduction. More particularly, the present disclosure relates to color reproduction of arbitrary colors in a predetermined workflow. The present disclosure also relates to error analysis with respect to color reproduction in a predetermined workflow. In exemplary embodiments, the predetermined workflow is a two-stage workflow including a proofing stage and a production stage.

2. Background Art

The printing of arbitrary colors (e.g., spot colors) within a complex printing process is a common requirement. It is not unusual for a particular printing assignment, for example, an advertisement, packaging, etc., to contain both photographic and brand-specific colors. Notably, brand-specific colors are often selected without regard to image content. Examples of brand-specific colors include, but are not limited to, logo colors, trademark colors, background colors, for example, on broad areas of packaging, for highlighting other brand-specific colors, etc.

In many cases, particularly with respect to logos and trademarks, a same design must be accurately and uniformly reproduced across various types of media. A modern example of this is the use of "automobile wraps," wherein an automobile (or other moving vehicle) is "wrapped" with advertising content (commonplace, for example, with racing vehicles and with local commercial vehicles). In these instances, it is often a requirement that the reproduced colors match the target colors, for example, the colors of an advertised product, logo, trademark, etc., very closely.

The difficulties in achieving color uniformity are apparent from any process for reproducing colors. For example, one may start with a physical reference. In the case of many color systems, this is a physical guidebook, for example, the Pantone® PMS+ guide. In some cases, however, a brand may use a particular specimen as a physical reference for a brand-color. In any case, the perceived physical reference is, at any given moment, subjected to viewing conditions. This introduces a degree of variability in that the physical reference may be perceived differently under different viewing conditions. Next an abstract color is defined linking the color of the physical reference to a colorimetric measurement, such as CIELAB of the color, for example, using a colorimeter or spectrophotometer, and/or a formulation color such as CMYK. The abstract color is normally defined colorimetrically and/or spectrally. The abstract color may then be rendered, for example, printed or displayed. Once again, the rendered color is subjected to a set of viewing conditions resulting in a perceived rendered color.

In general, the goal of any color reproduction process is to ensure that a color which is selected as a perceived color of a physical guide is visually reproduced by the rendered color on a selected media (sometimes for a predetermined set of viewing conditions). One challenge is therefore to reproduce an arbitrary color in a reproduction system that typically reproduces or is required to reproduce other color data in predetermined fashion (for example, where processing cannot be altered for the sake of the arbitrary color). In many situations, a physical reference color may not be reproducible within the limitations of the selected color workflow (known as an "out-of-gamut color"). Conventional printing systems and methods often have difficulties reproducing out-of-gamut colors. These and other difficulties are addressed by the systems and methods of the present disclosure.

In addition to benefits associated with the disclosed systems and methods for reproduction of arbitrary colors in a work flow, the present disclosure also improves on systems and methods for analyzing errors in a color reproduction process. A typical workflow, for example, for a print press, may generally involve a two-stage workflow including a proofing stage and a production stage. The proofing process advantageously enables a customer to visualize how a finished printed product will look. Proofing can either involve a physical proof (for example, using a printing proofer, typically a large format printer, separate from the production stage) or a virtual proof (for example, using a display). In either case, the generation of the proof involves a color reproduction process. A customer may advantageously use the proofing stage to fine-tune the desired appearance of the printed product. Once a customer is satisfied with the proof, the workflow switches to the production stage. The production stage may typically include a formulation process relating to ink output and a press process relating to a press output. Notably, both the formulation of the ink output and the printing of the press output involve a color reproduction process. The reason for the two-stage workflow is that, due to set-up costs, proofing via the production stage would be cost-prohibitive. The present disclosure addresses some of the difficulties in integrating error analysis into a two-stage workflow such as described above.

SUMMARY

Systems and methods are disclosed herein for facilitating reproduction of arbitrary colors in a predetermined workflow. Arbitrary colors are colors that are selected for reproduction, often without prior knowledge or consideration of the color reproduction abilities and limitations of the workflow. For example, a particular workflow may be constrained by international or local standards which must be maintained, for example, for the production of simultaneous printed matter along with the arbitrarily specified color. The fact that the arbitrary colors may be selected without regard to the reproduction process can lead to errors, which are mitigated by the systems and methods disclosed herein.

According to exemplary implementations of the present disclosure, advantageous systems and/or methods for analyzing a workflow involving color reproduction are provided. The disclosed systems/methods generally identify one or more color reproduction processes in a workflow and characterize each of the one or more color reproduction processes. As part of the characterization, the disclosed system/method generally determines a statistical variance (e.g., as characterized by a probability density function) for each of the one or more color reproduction processes with respect to reproducing one or more colors. The disclosed system/method may be effective in characterizing a plurality of color reproduction processes in the workflow. In addition, the disclosed system/method may further function to calculate a statistical error stack, e.g., based at least in part on a combined impact of color reproduction variations (e.g., random variations) contributed by each of the plurality of color reproduction processes.

Determination of a statistical variance (e.g., as characterized by a probability density function) according to the present disclosure may include compensating for operator, instrument and/or media (OIM) variability. Such compensation for OIM variability may involve determining a joint probability density function representing a combined impact of the process and the OIM on color reproduction variability. The compensation may further include determining an OIM probability density function representing an impact of OIM, e.g., on color reproduction variability, and deconvolving the OIM thus representing the statistical probability density function for the process (e.g., with the probability density function of the measurement process removed).

Typically, the disclosed systems and methods are applicable to workflows that include at least a two-stage workflow, e.g., a proofing stage and a production stage. The color reproduction process(es) may include one or more of (i) a proofer process, (ii) a formulation process and (iii) a press process. In addition, certification of the one or more color reproduction processes identified in the workflow may be accomplished according to the present disclosure, e.g., prior to characterization thereof. Such certification may include one or more of: (i) evaluating, (ii) calibrating and/or (iii) validating an operation of each of the one or more color reproduction processes with respect to a standard.

The disclosed systems/methods may further include simulating based on the statistical variance (e.g., as characterized by a probability density function) for the reproduction of a desired color, one or more possible output colors for each of the one or more color reproduction processes (e.g., based upon the probability density function of the reproduction process). The color reproduction process(es) may include a gamut-mapping process. For example, the gamut-mapping process may include a step of consulting, for an out-of-gamut desired color, a database of characterized artistic adjustments. The artistic adjustments may be characterized by a vector representing a direction and magnitude of the adjustment with respect to one or more of hue lightness and colorfulness. In addition, consultation of the database may include selecting a first adjusted color by applying an artistic adjustment from the database to the desired color. If the first adjusted color is out-of-gamut, for example, a second adjusted color may be selected by adjusting a magnitude of the vector characterizing the applied artistic adjustment. According to exemplary embodiments of the present disclosure, the database may be continually compiled based on past selections for adjusting colors. In exemplary embodiments, a same or different artistic adjustments may be applied sequentially, e.g., until an in-gamut color is achieved The present disclosure also provides an advantageous system/method for simulating one or more possible output colors for a color reproduction process, wherein the system/method identifies a desired color for reproduction; and determines one or more possible output colors for the color reproduction process based on a predetermined statistical variance (e.g., as characterized by a probability density function) for the color reproduction process with respect to reproducing the desired color. The system/method may display the one or more possible output colors, e.g., in an arrangement that is based on an order of probability.

Still further, the present disclosure provides a system/method for mapping out-of-gamut-colors for a color reproduction process which involves (i) providing an out-of-gamut color; (ii) consulting a database of characterized artistic adjustments, wherein the artistic adjustments are characterized by a vector representing a direction and magnitude of the adjustment with respect to one or more of hue lightness and colorfulness; (iii) selecting a first adjusted color by applying an artistic adjustment from the database to the out-of gamut color; (iv) determining if the first adjusted color is out-of-gamut; and (v) if the first adjusted color is out-of-gamut, selecting a second adjusted color by adjusting a magnitude of the vector characterizing the applied artistic adjustment. According to exemplary implementations of the disclosed system/method, the database is continually compiled based on past selections for adjusting colors.

Additional features, functions and benefits of the disclosed systems and methods will be apparent from the description which follows, particularly when read in conjunction with the appended figures.

BRIEF DESCRIPTION OF THE DRAWINGS

To assist those of ordinary skill in the art in making and using the disclosed systems and methods, reference is made to the appended figures, wherein.

DESCRIPTION OF EXEMPLARY
EMBODIMENT(S)

The present disclosure relates to systems and methods for characterizing error probabilities for a color reproduction process, for example, a reproduction process in a two-stage workflow including a proofing stage and a production stage. In exemplary embodiments, the characterization process may be preceded by a certification process for evaluating, calibrating and/or validating the operation of one or more color reproduction processes in the workflow. In further exemplary embodiments, results of the characterization process may be used in conjunction with a simulation process for simulating a predicted output appearance of an arbitrary color based on the error probabilities.

The present disclosure also relates to systems and methods for gamut-mapping (particularly with respect to arbitrary colors) in a printing process, for example, a press process of a two-stage workflow including a proofing stage and a printing stage. More particularly, gamut-mapping may utilize mapping suggestions compiled based upon historical artistic mitigation of color errors, for example, wherein the suggestions are compiled and stored in a database.

Figure 1:
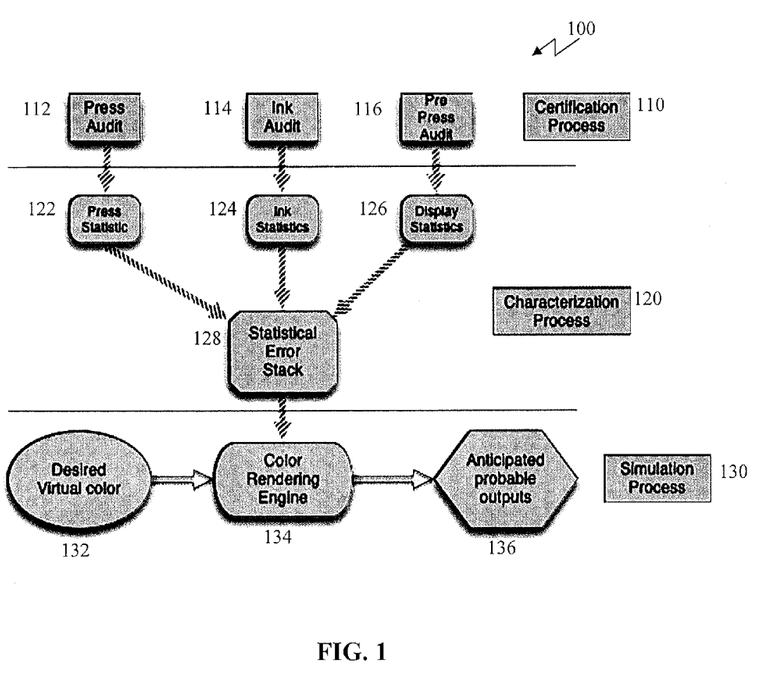
FIG. 1 depicts an exemplary method for modeling an output for a color reproduction process of an arbitrary color, according to the present disclosure.

With initial reference to FIG. 1, an exemplary method 100 is depicted for modeling the reproduction of an arbitrary color via a color reproduction process. The method 100 may generally include three phases: a certification phase 110, a characterization phase 120, and a simulation phase 130. The certification phase 110 may generally involve confirming that the facility and systems utilized in the reproduction process are capable of performing the required workflow. More particularly, the certification phase may include steps of press auditing 112, ink auditing 114 and pre-press auditing 116 which are described in greater detail below.

The characterization phase 120 generally involves determining error probabilities with respect to one or more color reproduction processes in a workflow. Characterization of color reproduction processes in a workflow 200 is schematically depicted in and described with reference to FIG. 2. The characterization phase 120 is further described with respect to FIGS. 3-7, below. The determined error probabilities of the characterization phase 120 may advantageously enable predictive error modeling for implementation in the simulation phase 130. In general, the simulation phase 130 involves generating probable visual and/or numerical outcomes based on the determined error probabilities of the characterization phase 120. Thus, for example, the simulation phase 130 may advantageously simulate an expected appearance of an arbitrary color during reproduction based on the error probabilities. The simulation phase 130 is also described in greater detail in the sections that follow.

I. The Certification Phase:

As noted above the certification phase 110 may generally include steps of press auditing 112, ink auditing 114 and pre-press auditing 116, each of which is described in greater detail below:

a. Press Auditing:

In general, press auditing 112 confirms for a press process in a workflow (for example, press process 230 of FIG. 2) that all the tools and procedures are in place to achieve accurate color matching throughout the workflow. In order to achieve a best color match to a 4-color print output, such as CMYK (including for arbitrary colors), it is important that press conditions conform with the manufacturer's recommended settings and that all tools and procedures are in place to maintain process control that complies, for example, with ISO 12647. When the specific requirements of a print specification (such as ISO, SWOP, GRACoL or one of the FOGRA specifications) are met and the press process is run to the target values for that specification, then the press process is able to "come up to color" faster and with a more accurate match to the proofs.

It is noted that ISO 12647 no longer includes target process solid ink densities. Rather, ISO 12647 specifies CIELab (L*a*b*) values for process solid inks. Tone Value Increase (TVI), also known as dot gain, may typically be monitored to be sure that it is within tolerance of the production, as defined by the press calibration. If this is out of tolerance, it could be a symptom of a bad plate curve or other conditions for the press process that are out of manufacturer's specifications. In some embodiments, it may be important to monitor CIELab (L*a*b*) values for arbitrary colors, particularly since these values are usually the same target values used to formulate the ink. This may help improve coordination between a formulation process (for example, formulation process 220 of FIG. 2) and the press process. As part of press auditing 112, a press test form may be printed using the calibrated press process. The press test form may include, for example. ISO digital control strips and two spot colors (typical colors may be PANTONE® 258 and PANTONE® 444). Note that the selected colors typically match colors used in the ink auditing 114.

Figure 2:
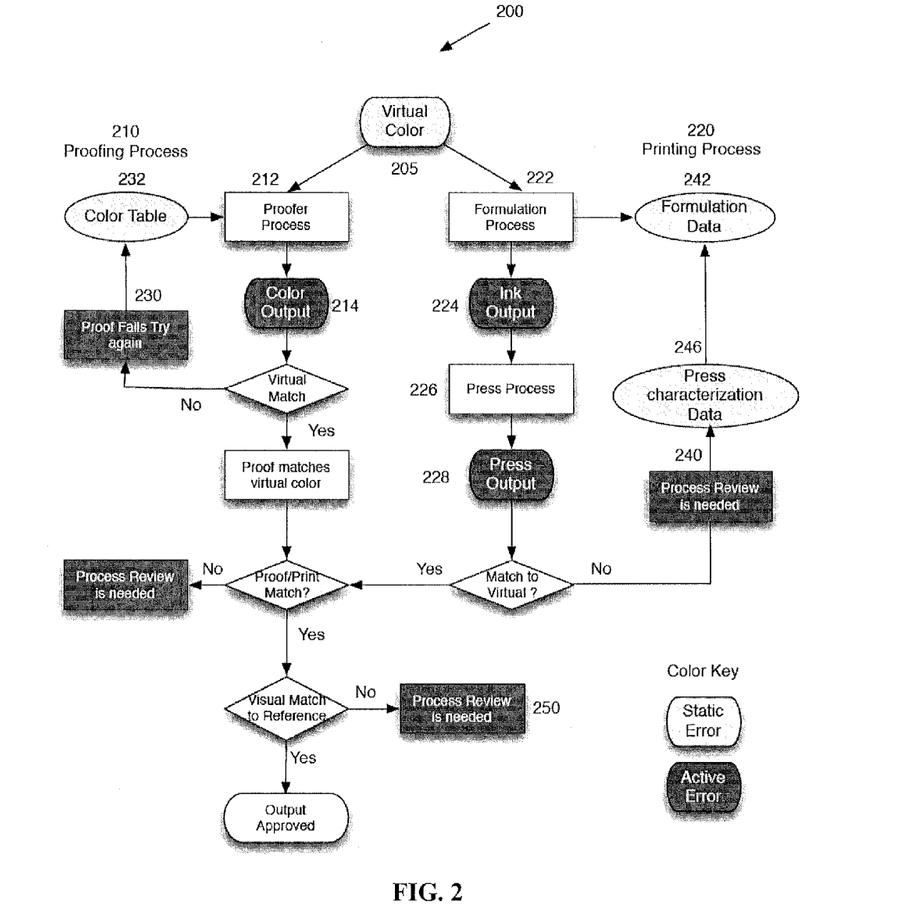
FIG. 2 depicts an exemplary two stage workflow including a proofing stage and a production stage, according to the present disclosure.

A color measuring device, such as a colorimeter or spectrophotometer, may be used to measure ISO tolerances and PANTONE® matching for the test sheet. In exemplary embodiments, reference color swatches of the two Pantone Colors may also be provided. These swatches may advantageously be measured and compared to color measurements of the spot colors on the press test sheet, thereby accounting for lighting conditions. In exemplary embodiments, a minimum number of test sheets (for example 10) are printed and tested. In some embodiments, all of the targets on the test sheets must meet a predetermined specification (for example, threshold) to achieve certification.

b. Ink Auditing:

The formulation of color inks is complex and typically requires sophisticated knowledge and practice to match a reference. To this end, ink auditing 114 typically involves auditing all equipment, software, calibration and certification records, test methods, work instructions and the like. As part of ink auditing 114, a PANTONE® press test form, such as described above with respect to press auditing 112, may be printed using the calibrated press process. Again, ISO tolerances and PANTONE® matching can be measured. In exemplary embodiments, ink drawdowns are provided (along with measurement and formulation data). Measurements may be made of multiple drawdown samples to estimate a repeatability of the drawdown process. It is noted that the fact that an ink appears to be a good match on a drawdown does not necessarily imply that the ink will reproduce properly on any press. Thus, small corrections are almost always beneficial when dealing with final press conditions.

c. Prepress Auditing:

In exemplary embodiments, prepress auditing 116 may include softproofing on calibrated displays and/or calibrated hard proofing of one or more test colors, shapes, etc., for example using a proofer process, such as the proofer process of FIG. 2. Softproofing on calibrated displays and calibrated hard proofing may provide a very good simulation of process builds of PANTONE® colors on the press. When using PANTONE® colors, the PANTONE® Guide and Chip Books will show the client a better example of the ink color that will be run on press. The proofs and swatches are typically assessed under proper viewing conditions, for example, conforming to industry recognized ISO 3664:2009. Once a color is specified properly in a file, a calibrated plate may be generated. Note that plates made in accordance to ISO standards for tone value increase (TVI) or using neutral print density curves (NPDC) will assure proper output on press, and a good match to the proof. NPDC may advantageously provide additional grey balance on press, which will help hold neutral grey in check as well as important pastels and near neutral colors. A library containing the arbitrary colors may be checked for accuracy in this step.

II. The Characterization Process:

In general, a goal of the characterization phase 120 is to capture data that can be used to statistically model process variability for one or more reproduction processes in a workflow. With reference to FIG. 2, an exemplary workflow 200 is depicted. The workflow 200 is a two-stage workflow, including a proofing stage 210 and a production stage 220. For the proofing stage 210, a proofer process 212 is fed a virtual color 205, for example, as a spot color or as part of a test image or the like. The proofer process 212 may then render a color output 214 for the virtual color 205, for example, on a test sheet or a display. In practice, the rendered color output 214 may serve as a proof for previewing an expected press output 218 of the production stage 220. For the printing stage 220, a formulation process 222 is fed the virtual color 205. An ink output 224 for the formulation process 222 is then used by a press process 226 to produce the press output 228. Ideally, the press output 228 should be the same as the color output 214 which should be the same as the virtual color 205. Unfortunately, this is not always the case. Rather, each of the proofer process 212, the formulation process 222 and the press process 226 may introduce a statistical variability to the color output 214, ink output 224 and press output 228, respectively.

As depicted in FIG. 2, the workflow 200 may include means for comparing each of the color output 214 to the virtual color 205 and the press output 228 to the color output 214. In either case, if higher than an acceptable degree of variance is detected, an active error 230 and 240 is triggered resulting in the output being disapproved. In an active feedback system, the detected variance may inform, for example, adjust and/or optimize the color table 232 for the proofer process 212, the press characterization data 246 for the press process 226 and the formulation data 242 for the formulation process 222. In a passive feedback system, the detected variance may inform a static error analysis of the color table 232, the press characterization data 246 and the formulation data 242. In exemplary embodiments, the press output 228 may also be subject to a visual variance test prior to output approval. In particular, a failed visual match may trigger active error 250.

With reference still to FIG. 2, the workflow 200 may be characterized using standard targets, such as the Fogra or IdeAlliance printing targets. More particularly, a virtual color 205, for example, for a standard target is run through both the proofing stage 210 and the production stage 220 of workflow 200. A color output 214 of the proofer process 212 may be evaluated relative to the original virtual color 205 to assess a degree of variance for that color. Similarly, an ink output 224 and/or a press output 228 may also be evaluated relative to the virtual color to assess a degree of variance for that color. The process may be repeated for same and different colors to produce for each tested color Probability Density Function (frequency histogram) for each of the proofer process 212, the formulation process 222 and the press process 226.

In exemplary embodiments, such as depicted in FIG. 1, error statistics may be calculated for each of press 122, ink 124 and display 126 based color reproductions. A stack error 128 may be compiled by considering a combined impact of press 122, ink 124 and/or display 126 based color reproductions.

Figure 3:
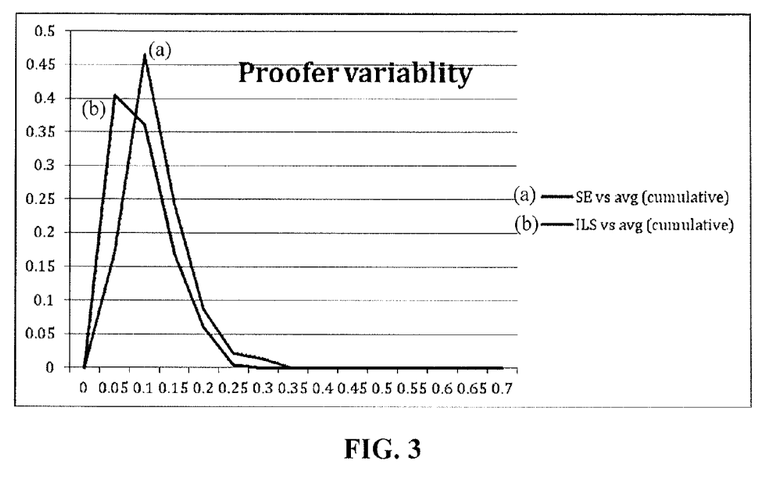
FIG. 3 depicts a representative plot of an exemplary frequency histogram for a typical proofing device, according to the present disclosure.

With reference to FIG. 3, a representative plot of an exemplary frequency histogram of sheet to sheet variation for a typical proofer process (for example, proofer process 212 of FIG. 2) is depicted. The horizontal axis is Delta E* 2000 and the vertical axis is relative frequency of occurrence. In mathematical terms, this represents the Probability Density Function of the device variation. FIG. 3 shows that typically the proofing part of the system has very low variability. The variability is measured by making multiple, independent, replicate measurements of the same process target. The local spectral average of each point in the target is used as the reference for the delta E* calculation. This represents the Operator-Instrument-Media model or OIM (SE represents Spectro Eye™ and ILS represents Intellitrax™). FIG. 3 shows that neither OIM exceeds 0.35 delta E* error. This is considered very good performance.

Figure 4:
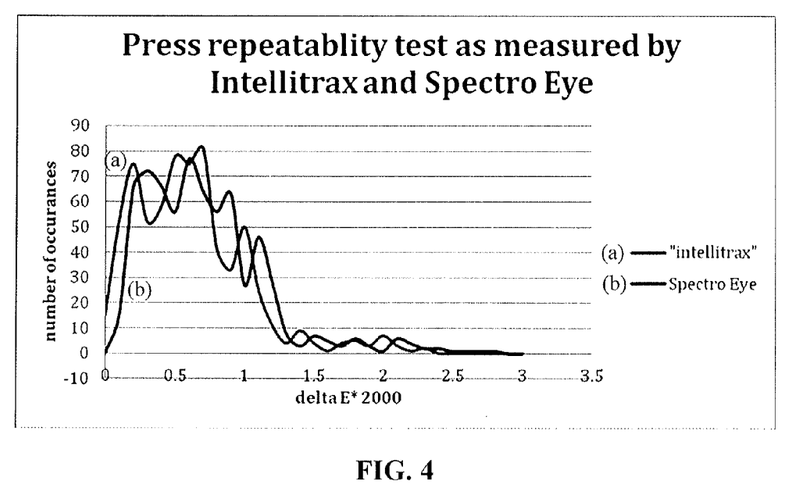
FIG. 4 depicts a representative plot of an exemplary frequency histogram for a typical printing device, according to the present disclosure.
Figure 5:
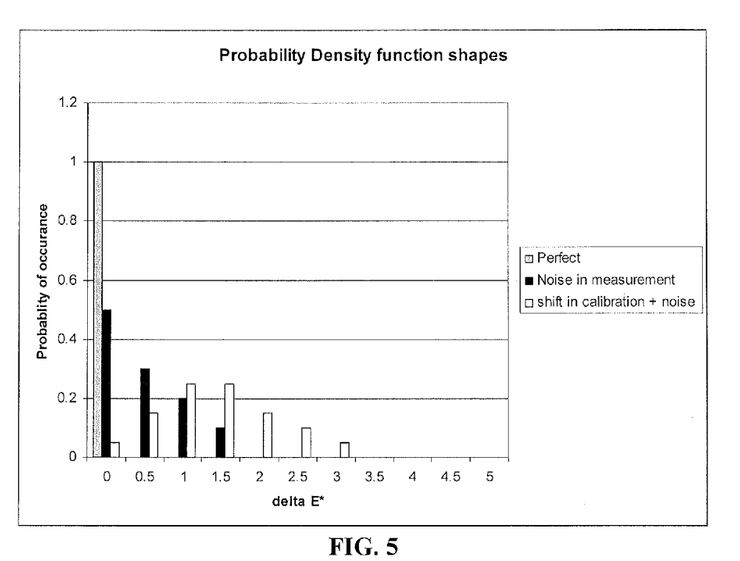
FIG. 5 depicts exemplary probability distribution functions for distributions for ideal, slightly noisy and improperly calibrated measurements, according to the present disclosure.

With reference to FIG. 4, a representative plot of an exemplary frequency histogram of sheet to sheet variation for a typical press process (for example, press process 226 of FIG. 2) is depicted. FIG. 4 demonstrates that the variability of the press process typically considerably exceeds the variability of the proofer process. Notably, since the proofer process is typically about 5 times less variable than the press process, the proofer process may be used to visually simulate the variability of the press process without its own variability overly impacting the simulation.

As noted above with respect to FIG. 2, the workflow 200 may be characterized by a statistical variance (e.g., as characterized by a probability density function) that occurs, for example, for each of the proofer process 212, the formulation process 222 and the printer process 226. Variance may effectively be determined via a color measurement process. Any color measurement, however, exhibits a degree of statistical variance on its own. For example, if a measurement process is used to characterize a press process, an inherent variance of the measurement affects the characterization. Common statistical theory demonstrates that the variance of independent variables sum. The resulting variance of the combined process is therefore larger than either of the separate processes. This effect can be called an error stack, because the variances "stack up" to yield a larger value.

$$\tau_{total}^2 = \tau_{process1}^2 + \tau_{process2}^2 \qquad \text{Equation 1}$$

This relationship is the consequence of the fact that the probability distribution of the sum of two random variables is the result of the mathematical convolution of the individual probability distribution of each random variable.

$$P(x) = P_1(x) \otimes P_2(x) \qquad \text{Equation 2}$$

where the symbol $\otimes$ represents the mathematical convolution

For the purpose of statistical quality control, it is therefore advantageous to be able to separate the variance, for example, of the press process, from the variance introduced by the measurement instrument. Thus, in exemplary embodiments, the variance of the measurement instrument can be measured independently, for example, by making repeated measurements of a same sample set. The joint probability distribution of instrument and print process is found by making multiple measurements of the print process. If the probability distribution of the measurement instrument is known, the probability distribution of the print process can be determined using a procedure known as de-convolution. Methods of de-convolution are well described in technical literature, particularly related to imaging and spectroscopy. These same methods can be applied to the statistical process described above. This is important because different instruments are often used in a complex process and it may be necessary to understand the impact of the measurement process upon each element of a combined workflow. This is especially true if an established workflow is being re-characterized by a different instrument.

Common practice in the Graphic Arts industry utilizes a colorimetric description of error that is termed "Delta E*". The goal of any Delta E* measurement is to relate the physical difference of two measured colors to their apparent perceived visual difference. The complex nature of the visual process leads to non-linear numeric evaluation of the Delta E* number. The acceptance criteria of a process is often based upon delta E* value. If a probability distribution of a process is described in terms of delta E*, a statistical estimate of the probability of acceptability can be determined. The methods used to determine Delta E* are varied, but a Delta E* measurement has particular characteristics that can be used to determine the nature of the variability.

By definition, a Delta E* measurement is always positive. The Delta E* value is the result of numerically reducing a three dimensional space to a single estimate of magnitude of error without regard to direction. Statistically, this type of error is termed "one tailed" or "single tailed" error. If a measurement instrument, proofer process, press process, etc., was perfect and exhibited no error relative to a standard (i.e., no variability), then the probability distribution would be represented by a single value at the origin of the Delta E* axis. This implies no variability (e.g., that 100% of the measurements are perfect). See FIG. 5, light grey. This function is termed a delta or dirac function. Delta E* is the result of a difference between a standard and measured value, so, for example, if an instrument is perfectly calibrated on the average, but there is some noise, the distribution will start to decline from the origin. See FIG. 5, dark grey. If, however, a measurement is not perfectly calibrated to the standard, the peak of the probability distribution will shift due to the offset of the calibration value. See FIG. 5, white. This offset now has a "two tailed" distribution. If a probability distribution of a measurement instrument relative to a standard results in a two tailed structure, it can be assumed that the calibration of the instrument is not the same as the standard. Two-tailed distributions can also be the result of random errors that are not zero mean errors.

Figure 6:
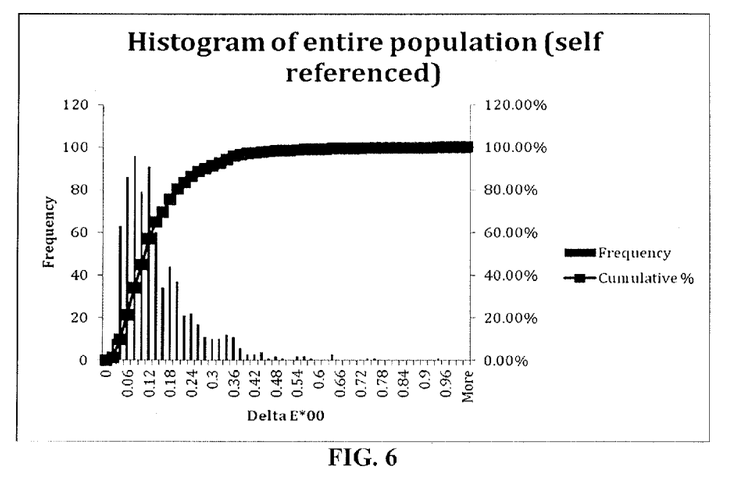
FIG. 6 depicts an exemplary probability distribution function reflecting operator media and instrument variability, according to the present disclosure.

In exemplary embodiments, a measurement of instrument variability can be performed that is self-referenced. This method may be particularly useful for determining the statistical noise of the measurement process without regard to the measurement device calibration. FIG. 6 illustrates an exemplary probability density function of a self-referenced data set. This data is based upon multiple replicate measurements of a target. Each target element is locally spectrally averaged. This average is used as the reference data for calculation of the local Delta E*. The data for FIG. 6 represents five (5) replicates of 150 colors. This data represents the operator, media and instrument variability. In exemplary embodiments, this is termed the OIM probability density function.

Figure 7:
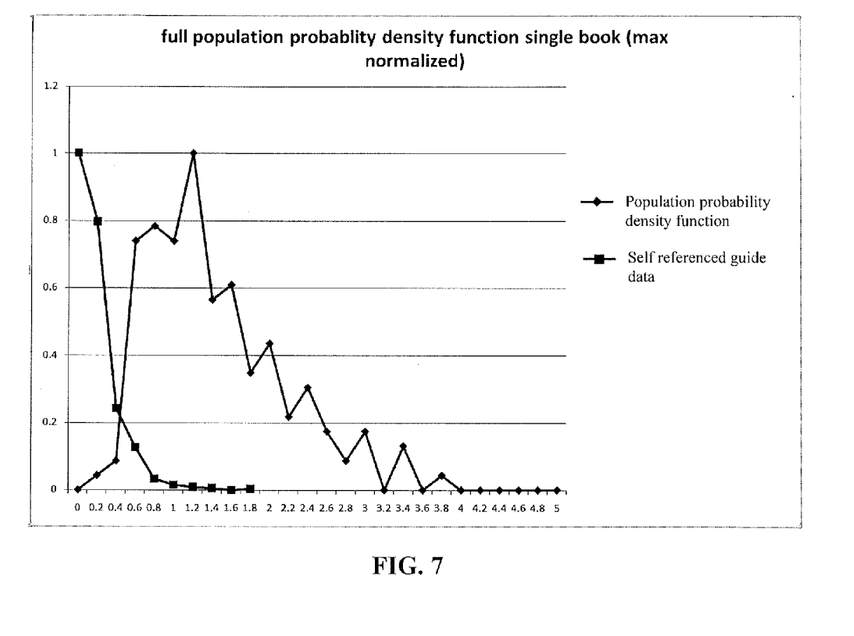
FIG. 7 depicts an exemplary deconvolution of a probability distribution function to eliminate operator media and instrument variability, according to the present disclosure.

FIG. 7 illustrates an exemplary probability distribution function generated by the same data as FIG. 6 when using the virtual color for each patch as a reference. The full population density function in FIG. 7 is the convolution of the OIM and the Process Probability Density functions. The Process Probability Density function is determined by deconvolution. This deconvolution process can be accomplished using Fourier Transform techniques or using matrix methods.

The segmentation of the OIM from the measurement population allows for estimation of results using other instruments in the chain. For each statistical characterization, the OIM of the process and the Joint Probability Distribution Function (JPDF) are measured. The Process Probability Distribution Function (PPDF) is determined by deconvolution of the OIM and JPDF. The PPDF represent the process statistics without the influence of the measurement statistics. The simulation of a particular workflow is accomplished by convolving the PPDFs for each step in the workflow and then convolving the OIM in the final step. For example, if it is assumed that a particular process includes a formulation step, printing step, and measurement step on a particular media with a known OIM, the resultant error distribution function can be described as in equation 3:

$$P(dE^*)_{total\_process} = P(dE^*)_{formulation} \otimes P(dE^*)_{prnt} \otimes OIM(dE^*) \quad \text{Equation 3}$$

where the symbol $\otimes$ represents a numerical convolution of the specific probability density functions.

As noted above, a typical printing system may not be capable of printing all arbitrary colors in a given color set. A representative color set example is the Pantone® PMS+ coated color set. This set of colors represents one of the more demanding color sets and has a very wide gamut that is not usually reproducible by a 4 color CMYK system.

There are many documented gamut mapping methods, e.g., as described in "Color Gamut Mapping" by Jan Morovic, or "Development and Evaluation of Six Gamut-Mapping Algorithms for Pictorial Images" by Braun, Balasubramanian, and Eschbach.

The present disclosure provides a unique gamut mapping algorithm based on cumulative database of historical artistic decision making. More particularly, to develop the algorithm, the operations of more than 50 printers were reviewed. For each of these printers, artistic adjustments were made to colors outside of the defined gamut colors to move them into the printable range. The artistic adjustments (for example, based on hue and lightness and colorfulness) were compiled, reviewed and modeled to construct the gamut mapping algorithm of the present disclosure. More particularly, the artistic judgments were characterized in three dimensional color space based upon the location point of the virtual color and the selection of the final color. Based on the hue of the initial color, an ordered list of vectors may be calculated based upon the lightness and colorfulness of the resultant color. Thus, the move in color space may be described by a magnitude and angle from a point described by the hue, lightness and colorfulness.

The historical database of thus characterized artistic adjustments may be accessed when a need arises to move a virtual color based upon a gamut constraint caused by a new printing condition. For example, the historical database may be consulted based upon hue. Historical moves are then tested. If the historical collection value is still not in gamut, or if the historical collection proves unsatisfactory, the selection process advantageously may follow the historical vector, increasing (or decreasing) the vector length until a color is selected that is in gamut. In some embodiments, a user may select only one or more dimensions (from hue lightness and colorfulness) in which to manipulate the vector length. Once a color is selected that is in gamut, this color selection is proofed and reviewed by the user. In some embodiments, if accepted, the new vector may then be stored in the database, either replacing or supplementing the original vector.

Figure 8:
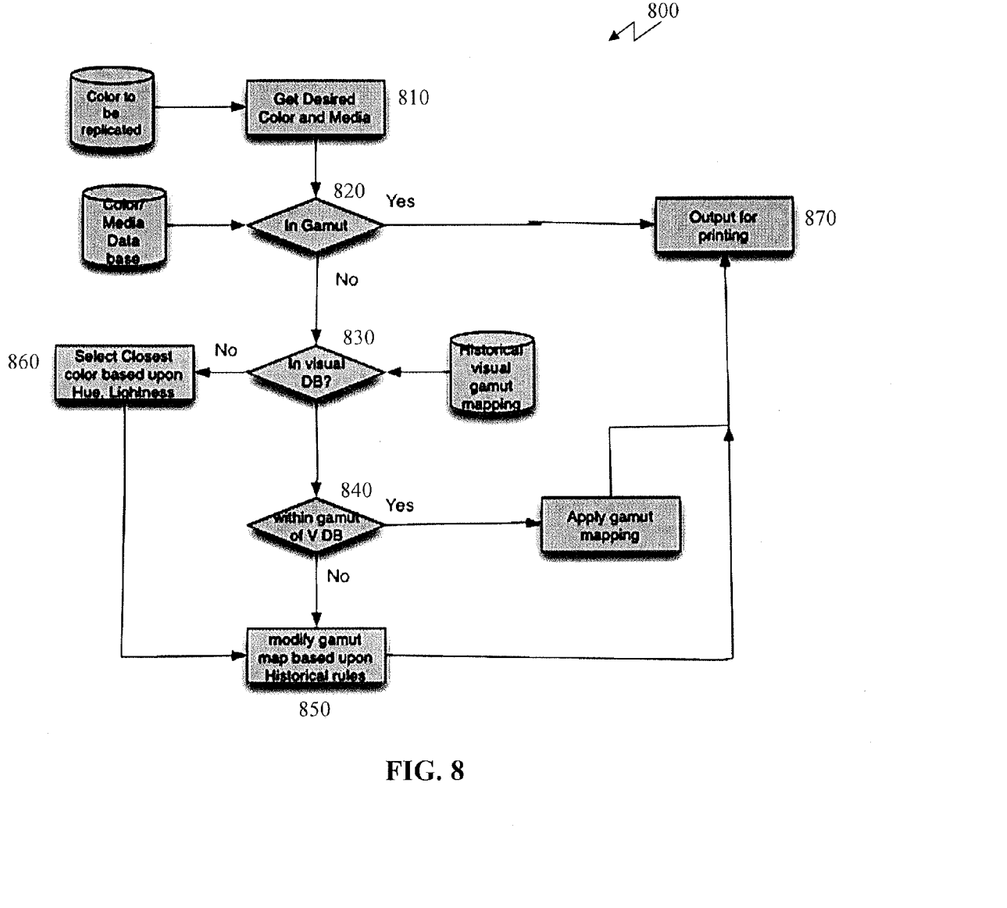
FIG. 8 depicts an exemplary method for reproducing a color using gamut-mapping techniques, according to the present disclosure.

FIG. 8 depicts a flow chart of an exemplary method for reproducing a color using the gamut-mapping techniques described herein. At step 810, a color and media are selected for printing. At step 820, a color/media database is consulted to determine if the selected color-media combination is within the gamut of reproducible colors. If the color-media combination is within the gamut of reproducible colors, the color is outputted for printing at step 880. If, however, the color is outside of the gamut of reproducible colors, the disclosed method proceeds to step 830 where a historical visual gamut mapping database (as described above) is consulted to determine if there is a historical mapping for the color. If there is a historical mapping, the color selection based on the historical mapping is analyzed at step 840 to determine if it is in the gamut of reproducible colors. If the color selection based on the historical mapping is in the gamut of reproducible colors, gamut mapping is applied at step 870 and the color is outputted for printing at step 880. If, however, the color selection based on the historical mapping is outside the gamut of reproducible colors, the gamut map is modified at step 850 based on the historical rules (for example, by increasing or decreasing the characteristic vector) until a color that is in the gamut is selected. The new mapping may then be saved and the selected color released for printing at step 880. Finally, if at step 830 the historical database does not include a mapping for the original color, the color is mapped at step 860 to the closest in gamut color based on characteristics such as hue, lightness, and/or colorfulness, before being released for printing at step 880. It is noted that the gamut mapping techniques of the subject application may be applied, for example, with respect to either the proofing stage 210 or the production stage 220 of FIG. 2.

III. Presentation of Simulated Colors.

As noted above, the final phase of the exemplary method described with respect to FIG. 1 is the simulation phase 130. In exemplary embodiments, the simulation phase 130 may include processing a desired virtual color 132 (for example, using a color rendering engine 134) to simulate probable outputs 134 of a process based on a pre-calculated statistical variance for that process (for example, calculated as described with respect to the characterization phase 120).

It will be appreciated that presentation of the simulated colors can be accomplished in a number of different formats. In exemplary embodiments, a well characterized proofer (i.e., a proofer showing a relatively low or a known degree of variance) can be used to generate an output showing a collection of potential outcomes. In exemplary embodiments, the collection of potential outcomes may be presented in a circular fashion, with the center of the circle as the target color and successive rings of color representing the potential outputs. In some embodiments, the ring nearest the center may represent the most likely (high probability) colors, while the outer rings may show less likely, but possible, outcomes.

Systems and methods disclosed herein may include or be implemented by one or more programmable processing units having associated therewith executable instructions held on one or more computer readable medium, RAM, ROM, hard drive, and/or hardware. In exemplary embodiments, the hardware, firmware and/or executable code may be provided, for example, as upgrade module(s) for use in conjunction with existing infrastructure (for example, existing devices/processing units). Hardware may, for example, include components and/or logic circuitry for executing the embodiments taught herein as a computing process.

Displays and/or other feedback means may also be included, for example, for rendering a proof of a virtual color and/or a simulation of a possible color output, as described herein. The display and/or other feedback means may be stand-alone equipment or may be included as one or more components/modules of the processing unit(s).

The actual software code or control hardware which may be used to implement some of the present embodiments is not intended to limit the scope of such embodiments. For example, certain aspects of the embodiments described herein may be implemented in code using any suitable programming language type such as, for example, assembly code, C, C# or C++ using, for example, conventional or object-oriented programming techniques. Such code is stored or held on any type of suitable non-transitory computer-readable medium or media such as, for example, a magnetic or optical storage medium.

As used herein, a "processor," "processing unit," "computer" or "computer system" may be, for example, a wireless or wire line variety of a microcomputer, minicomputer, server, mainframe, laptop, personal data assistant (PDA), wireless e-mail device (for example, "BlackBerry," "Android" or "Apple," trade-designated devices), cellular phone, pager, processor, fax machine, scanner, or any other programmable device configured to transmit and receive data over a network. Computer systems disclosed herein may include memory for storing certain software applications used in obtaining, processing and communicating data. It can be appreciated that such memory may be internal or external to the disclosed embodiments. The memory may also include non-transitory storage medium for storing software, including a hard disk, an optical disk, floppy disk, ROM (read only memory), RAM (random access memory), PROM (programmable ROM), EEPROM (electrically erasable PROM), flash memory storage devices, or the like.

Figure 9:
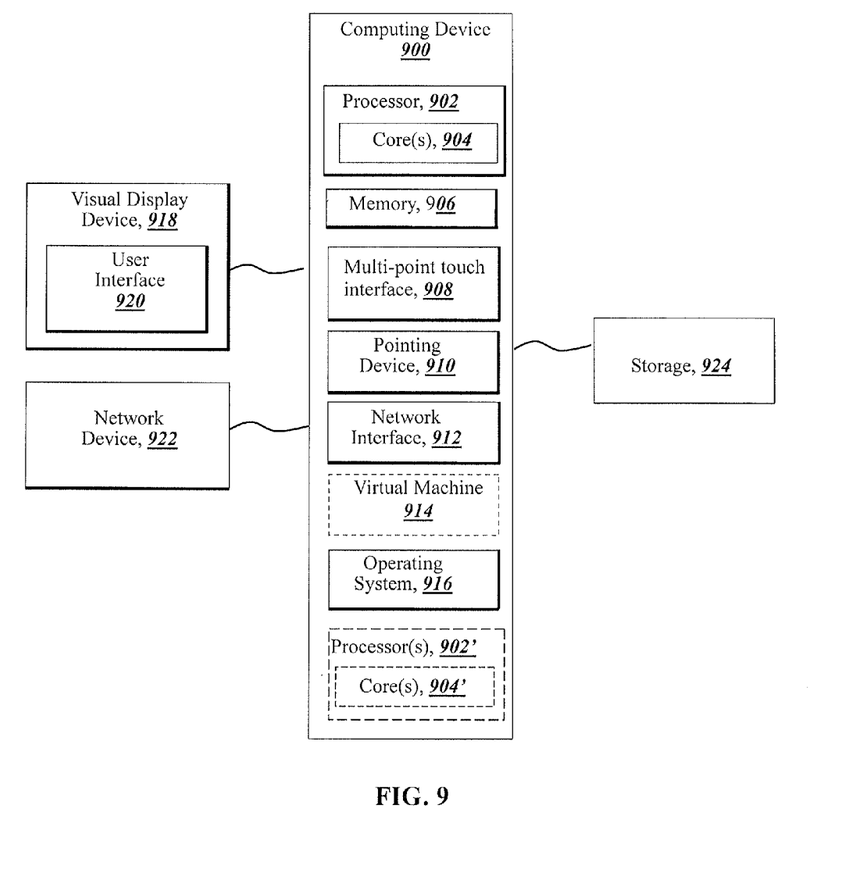
FIG. 9 depicts a block diagram of an exemplary computing device for implementing systems and methods described herein.

FIG. 9 depicts a block diagram representing an exemplary computing device 900 that may be used to implement the systems and methods disclosed herein. The computing device 900 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described herein. In exemplary embodiments, a distributed computational system may be provided comprising a plurality of such computing devices.

The computing device 900 may include one or more non-transitory computer-readable media having encoded thereon one or more computer-executable instructions or software for implementing the exemplary methods described herein. The non-transitory computer-readable media may include, but is not limited to, one or more types of hardware memory and other tangible media (for example, one or more magnetic storage disks, one or more optical disks, one or more USB flash drives), and the like. Memory 906 included in the computing device 900 may store computer-readable and computer-executable instructions or software for implementing the methods described herein. For example, memory 906 may store computer-readable instructions for characterizing a process for reproducing colors by determining a statistical variance (e.g., as characterized by a probability density function) for the process with respect to reproduction of one or more colors. In other embodiments, memory 906 may store computer-readable instructions for predicting a possible output color for a process for reproducing colors based on a statistical variance (e.g., as characterized by a probability density function) for the process. In yet other embodiments, memory 906 may store computer readable instructions for performing gamut-mapping, according to embodiments described herein. The computing device 900 also includes processor 902 and associated core 904, and in some embodiments, one or more additional processor(s) 902' and associated core(s) 904' (for example, in the case of computer systems having multiple processors/cores), for executing computer-readable and computer-executable instructions or software stored in the memory 906 and other programs for controlling system hardware. Processor 902 and processor(s) 902' may each be a single core processor or a multiple core (904 and 904') processor.

Virtualization may be employed in the computing device 900 so that infrastructure and resources in the computing device may be shared dynamically. A virtual machine 914 may be provided to handle a process running on multiple processors so that the process appears to be using only one computing resource rather than multiple computing resources. Multiple virtual machines may also be used with one processor.

Memory 906 may include a computer system memory or random access memory, such as DRAM, SRAM, EDO RAM, and the like. Memory 906 may include other types of memory as well, or combinations thereof.

A user may interact with the computing device 900 through a visual display device 918, such as a screen or monitor, which may display one or more graphical user interfaces 920. The visual display device 918 may also display other aspects, elements and/or information or data associated with exemplary embodiments. The computing device 900 may include other I/O devices for receiving input from a user, for example, a keyboard or any suitable multi-point touch interface 908, a pointing device 910 (e.g., a mouse, a user's finger interfacing directly with a display device, etc.). The keyboard 908 and the pointing device 910 may be coupled to the visual display device 918. The computing device 900 may include other suitable conventional I/O peripherals. The computing device 900 may include one or more audio input devices 924, such as one or more microphones, that may be used by a user to provide one or more audio input streams.

The computing device 900 may include one or more storage devices 924, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement exemplary embodiments as taught herein. In exemplary embodiments, the one or more storage devices 924 may provide storage for data that may be generated or utilized by the systems and methods of the present disclosure. For example, a storage device 924 may provide storage for a historical gamut-mapping database, such as described herein. The one or more storage devices 924 may further provide storage for computer readable instructions relating to one or more methods as described herein. For example, storage devices 924 may store computer-readable instructions for characterizing a process for reproducing colors by determining a statistical variance (e.g., as characterized by a probability density function) for the process with respect to reproduction of one or more colors. In other embodiments, storage devices 924 may store computer-readable instructions for predicting a possible output color for a process for reproducing colors based on a statistical variance (e.g., as characterized by a probability density function) for the process. In yet other embodiments, storage devices 924 may store computer readable instructions for performing gamut-mapping, according to embodiments described herein. The one or more storage devices 924 may be provided on the computing device 900 and/or provided separately or remotely from the computing device 900.

The computing device 900 may include a network interface 912 configured to interface via one or more network devices 922 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 912 may include a built-in network adapter, network interface card, PCMCIA network card, card bus network adapter, wireless network adapter, USB network adapter, modem or any other device suitable for interfacing the computing device 900 to any type of network capable of communication and performing the operations described herein. The network device 922 may include one or more suitable devices for receiving and transmitting communications over the network including, but not limited to, one or more receivers, one or more transmitters, one or more transceivers, one or more antennae, and the like.

The computing device 900 may run any operating system 916, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 916 may be run in native mode or emulated mode. In an exemplary embodiment, the operating system 916 may be run on one or more cloud machine instances.

Although the present disclosure has been provided with reference to exemplary embodiments and/or implementations of the disclosed systems and methods, the present disclosure is not limited by or to such exemplary embodiments/implementations. Rather, the present disclosure encompasses modifications, enhancements, variations and/or refinements to the systems and methods described herein, as will be readily apparent to persons skilled in the art based on the teachings presented herein.

The invention claimed is:

1. A method for analyzing a workflow involving color reproduction, the method comprising:
   identifying a plurality of color reproduction processes in the workflow;
   characterizing each of the plurality of color reproduction processes, wherein characterizing includes determining a statistical probability density function for each of the one or more color reproduction processes with respect to reproducing one or more colors; and
   calculating a statistical error stack considering a combined impact of color reproduction random variations contributed by each of the plurality of color reproduction processes.

2. The method of claim 1, wherein the workflow is a two-stage workflow including a proofing stage and a production stage.

3. The method of claim 1, wherein the plurality of color reproduction processes includes one or more of (i) a proofer process, (ii) a formulation process, and (iii) a press process.

4. The method of claim 1, further comprising certifying one or more of the plurality of color reproduction processes identified in the workflow prior to characterization thereof.

5. The method of claim 4, wherein certifying the one or more of the plurality of color reproduction processes includes one or more of: (i) evaluating, (ii) calibrating, and (iii) validating an operation of each of the one or more color reproduction processes with respect to a standard.

6. The method of claim 1, further comprising simulating based on the statistical probability density function for the reproduction of a desired color, one or more possible output colors for one or more of the plurality of color reproduction processes based upon the probability density function of the reproduction process.

7. A method for analyzing a workflow involving color reproduction, the method comprising:
   identifying one or more color reproduction processes in the workflow; and
   characterizing each of the one or more color reproduction processes, wherein characterizing includes determining a statistical probability density function for each of the one or more color reproduction processes with respect to reproducing one or more colors, wherein determining the statistical probability density function includes compensating for an operator, instrument, and media (OIM) variability.

8. The method of claim 7, wherein the compensating for an OIM variability includes determining a joint probability density function representing a combined impact of the process and the OMI on color reproduction variability, determining an OIM probability density function representing an impact of OIM and deconvolving the OIM probability density function, thus representing the statistical probability density function for the process alone, with the probability density function of the measurement process removed.

9. The method of claim 7, wherein the workflow is a two-stage workflow including a proofing stage and a production stage.

10. The method of claim 7, wherein the one or more color reproduction processes includes one or more of (i) a proofer process, (ii) a formulation process, and (iii) a press process.

11. The method of claim 7, further comprising certifying the one or more color reproduction processes identified in the workflow prior to characterization thereof.

12. The method of claim 11, wherein certifying the one or more color reproduction processes includes one or more of: (i) evaluating, (ii) calibrating, and (iii) validating an operation of each of the one or more color reproduction processes with respect to a standard.

13. The method of claim 7, further comprising simulating based on the statistical variance for the reproduction of a desired color, one or more possible output colors for each of the one or more color reproduction processes based upon the probability density function of the reproduction process.

14. A method for analyzing a workflow involving color reproduction, the method comprising:
identifying one or more color reproduction processes in the workflow; and
characterizing each of the one or more color reproduction processes,
wherein characterizing includes determining a statistical probability density function for each of the one or more color reproduction processes with respect to reproducing one or more colors,
wherein at least one of the one or more color reproduction processes includes a gamut-mapping process,
wherein the gamut-mapping process includes a step of consulting, for an out-of-gamut desired color, a database of characterized artistic adjustments, and
wherein the artistic adjustments are characterized by a vector representing a direction and magnitude of the adjustment with respect to one or more of hue lightness and colorfulness.

15. The method of claim 14, wherein the consulting the database includes selecting a first adjusted color by applying an artistic adjustment from the database to the desired color.

16. The method of claim 15, wherein, if the first adjusted color is out-of-gamut, a second adjusted color is selected by adjusting a magnitude of the vector characterizing the applied artistic adjustment, said method repeating until an in-gamut color is achieved.

17. The method of claim 16, wherein the database is continually compiled based on past selections for adjusting colors.

18. The method of claim 14, wherein the workflow is a two-stage workflow including a proofing stage and a production stage.

19. The method of claim 14, wherein the one or more color reproduction processes includes one or more of (i) a proofer process, (ii) a formulation process, and (iii) a press process.

20. The method of claim 14, further comprising certifying the one or more color reproduction processes identified in the workflow prior to characterization thereof.

21. The method of claim 20, wherein certifying the one or more color reproduction processes includes one or more of: (i) evaluating, (ii) calibrating, and (iii) validating an operation of each of the one or more color reproduction processes with respect to a standard.

22. The method of claim 14, further comprising simulating based on the statistical variance for the reproduction of a desired color, one or more possible output colors for each of the one or more color reproduction processes based upon the probability density function of the reproduction process.

23. A method for simulating one or more possible output colors for a color reproduction process, the method comprising:
identifying a desired color for reproduction;
determining one or more possible output colors for the color reproduction process based on a predetermined statistical probability density function for the color reproduction processes with respect to reproducing the desired color;
displaying the one or more possible output colors,
wherein the one or more possible output colors are arranged on the display in an order of probability.

24. A method for mapping out-of-gamut-colors for a color reproduction process, the method comprising;
providing an out-of-gamut color;
consulting a database of characterized artistic adjustments, wherein the artistic adjustments are characterized by a vector representing a direction and magnitude of the adjustment with respect to one or more of hue lightness and colorfulness;
selecting a first adjusted color by applying an artistic adjustment from the database to the out-of gamut color;
determining if the first adjusted color is out-of-gamut; and
if the first adjusted color is out-of-gamut, selecting a second adjusted color by adjusting a magnitude of the vector characterizing the applied artistic adjustment.

25. The method of claim 24, wherein the database is continually compiled based on past selections for adjusting colors.

* * * * *